(12) United States Patent
Grinwald

(10) Patent No.: US 8,202,022 B2
(45) Date of Patent: Jun. 19, 2012

(54) VIBRATORY PERCUSSION RAMMERS AND METHODS OF MAKING VIBRATORY PERCUSSION RAMMERS

(75) Inventor: Anthony Grinwald, Rubicon, WI (US)

(73) Assignee: M-B-W Inc., Slinger, WI (US)

( * ) Notice: Subject to any disclaimer, the term of this patent is extended or adjusted under 35 U.S.C. 154(b) by 0 days.

(21) Appl. No.: 13/012,982

(22) Filed: Jan. 25, 2011

(65) Prior Publication Data
US 2011/0116867 A1    May 19, 2011

Related U.S. Application Data

(63) Continuation-in-part of application No. 12/187,184, filed on Aug. 6, 2008.

(51) Int. Cl.
*E01C 19/32* (2006.01)
(52) U.S. Cl. .................................... 404/133.1
(58) Field of Classification Search ............ 404/133.05, 404/133.1, 133.2; 384/273, 300, 624
See application file for complete search history.

(56) References Cited

U.S. PATENT DOCUMENTS

| | | | | |
|---|---|---|---|---|
| 2,324,083 | A * | 7/1943 | Holmes | 29/898.055 |
| 2,353,925 | A * | 7/1944 | Pattison | 72/132 |
| 2,675,283 | A | 4/1954 | Thomson | |
| 2,851,314 | A * | 9/1958 | Thomson | 384/222 |
| 3,162,102 | A | 12/1964 | Juneau | |
| 3,277,801 | A | 10/1966 | Horvath et al. | |

(Continued)

FOREIGN PATENT DOCUMENTS

GB    1103714    2/1968

OTHER PUBLICATIONS

UK Search Report for corresponding Application GB 0911112.1 dated Sep. 3, 2009.

(Continued)

*Primary Examiner* — Thomas Will
*Assistant Examiner* — Matthew D Troutman
(74) *Attorney, Agent, or Firm* — Andrus, Sceales, Starke & Sawall, LLP

(57) ABSTRACT

A vibratory percussion rammer includes a gear box, a percussion delivery unit extending downwardly from the gear box, and one or more slide bearings disposed in the percussion delivery unit between adjacent surfaces of reciprocating metal components. The slide bearings are made from a sheet of plastic material that is curved into the shape of a tube having a C-shape in cross section and define an open seam extending the entire length of the slide bearing. Slide bearings according to this design can be disposed in the percussion delivery unit to eliminate some or all of the metal-on-metal contact between reciprocating components, including between the ram and shaft assembly and spring box and the guide cylinder, the spring separator and the spring box, and the shaft of a ram and shaft assembly and an upper end of the spring box. The seam width of any slide bearing is wider than the anticipated width-wise thermal expansion of the slide bearing during normal operation. When a plurality of slide bearings are used, the slide bearing that is the easiest to replace has a seam selected to close and fail at a temperature in excess of normal operating temperature that is lower than the excess temperature leading to failure of other slide bearings.

16 Claims, 8 Drawing Sheets

U.S. PATENT DOCUMENTS

| | | | | |
|---|---|---|---|---|
| 3,317,987 A | * | 5/1967 | Roemer | 29/898.056 |
| 3,538,821 A | | 11/1970 | Baeumers et al. | |
| 3,635,132 A | | 1/1972 | McIlrath et al. | |
| 3,734,585 A | * | 5/1973 | Conru | 384/298 |
| 3,756,735 A | * | 9/1973 | Linz | 404/133.05 |
| 3,842,473 A | * | 10/1974 | Couper | 29/898.056 |
| 4,005,944 A | | 2/1977 | Harris | |
| 4,514,097 A | * | 4/1985 | Daly | 384/93 |
| 4,518,205 A | | 5/1985 | Heathe | |
| 4,750,847 A | | 6/1988 | Boyd | |
| 4,770,546 A | | 9/1988 | Pentz et al. | |
| 4,865,467 A | | 9/1989 | Becker et al. | |
| 4,895,478 A | | 1/1990 | Artzberger | |
| 5,340,233 A | | 8/1994 | Motl | |
| 5,564,853 A | * | 10/1996 | Maughan | 403/137 |
| 5,880,043 A | | 3/1999 | Lorenz et al. | |
| 6,227,760 B1 | | 5/2001 | Togami et al. | |
| 6,443,651 B1 | | 9/2002 | Greppmair | |
| 6,464,396 B1 | | 10/2002 | Schubert et al. | |
| 6,548,188 B1 | | 4/2003 | Yanase et al. | |
| 6,749,365 B2 | | 6/2004 | Sina et al. | |
| 7,540,336 B2 | | 6/2009 | Steffen | |
| 7,682,102 B1 | | 3/2010 | Burke et al. | |
| 2005/0141791 A1 | | 6/2005 | Roos et al. | |

OTHER PUBLICATIONS

MBW, Inc., Compaction & Concrete Construction Equipment, 2007; Wisconsin Cyberlynk Network Inc.

* cited by examiner

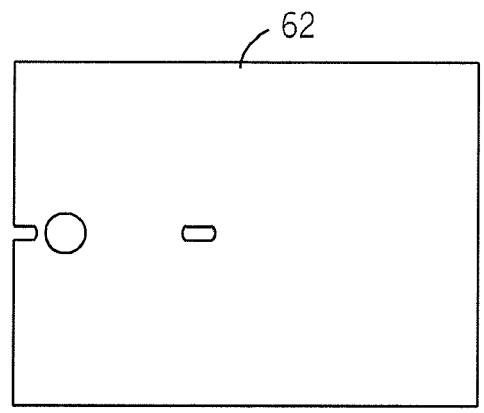
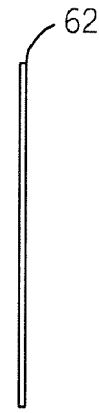
FIG. 6　　　　FIG. 7
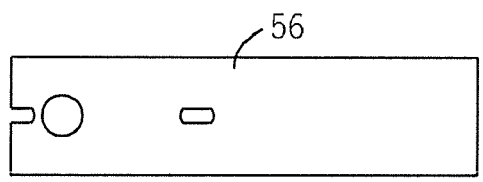
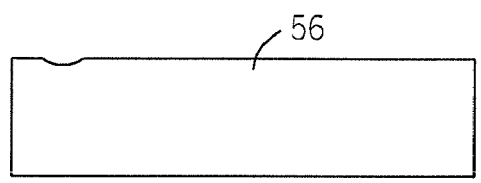
FIG. 8　　　　FIG. 9
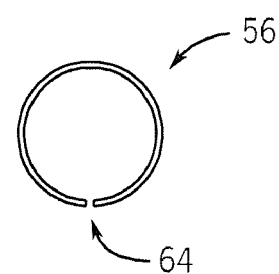
FIG. 10

VIBRATORY PERCUSSION RAMMERS AND METHODS OF MAKING VIBRATORY PERCUSSION RAMMERS

CROSS REFERENCE TO RELATED APPLICATION

This application is a continuation-in-part of U.S. patent application Ser. No. 12/187,184, filed on Aug. 6, 2008.

FIELD

The present application relates to vibratory percussion rammers and more specifically to wear components for vibratory percussion rammers.

BACKGROUND

Vibratory percussion rammers (hereinafter "rammers") are used in the construction industry to compact soil and other loose materials. A typical rammer provides a generally vertical movement to a ground-engaging shoe that compacts the ground with a pounding type of movement. Conventional rammers include a motor-driven gearbox and a handle that is grasped by the operator. A percussion delivery unit is suspended from the gearbox and typically includes a ram and shaft assembly that extends downwardly from the gearbox into a guide cylinder, a spring box that extends upwardly into the guide cylinder, and a spring separator that is connected to the ram and shaft assembly and disposed in the spring box between upper and lower springs. The ram and shaft assembly is typically connected via a connecting rod and gear drive to the output shaft of an engine that is mounted on the gearbox. The ram and shaft assembly is driven to reciprocate up and down and the spring box is configured to reciprocate divergently relative to the reciprocations of the ram and shaft assembly. The lower end of the spring box typically carries the ground engaging shoe. Alignment of the percussion delivery unit is maintained by metal-on-metal contact surfaces such as between the ram and the guide cylinder, the spring box and the guide cylinder, (optionally, the shaft and the upper end of the spring box), and the spring separator and the interior of the spring box.

The assignee for this application, M-B-W Inc., manufactures and sells uniquely designed rammers that have low cost, easily replaced, non-metallic wear components including slide bearings and spring separators for reducing internal wear between high tolerance, costly reciprocating metal components, namely the ram and the guide cylinder, spring box and guide cylinder and the spring separator and spring box.

The present application derives from the inventor's recognition of problems associated with manufacture and use of the assignee's uniquely designed rammers and the unique wear components associated with these rammers. For example, the inventor has determined that the assignee's wear components are difficult to efficiently manufacture and install. The assignee's slide bearings are machined from extruded polyethylene tube to a size that will fit and function properly in the percussion delivery unit. Both the extrusion process and the machining process are expensive and time consuming. The combination of both processes is especially expensive and time consuming. The machining process is particularly difficult because the slide bearings are self lubricating, flexible, difficult to handle, chuck, and cut, and are subject to volumetric instability with temperature change. For the above reasons and because of the length of the wear surfaces between the guide tube and the ram and spring box assemblies, the inventor has found that it is difficult and not economically feasible to machine a single wear component or slide bearing from extruded polyethylene tube or other thin bearing material capable of reducing wear along the entire length of the delivery unit wear surface. Rather it has been necessary to make several relatively shorter slide bearings which are spaced or stacked together in series along the interior length of the guide tube. Each of these wear components must be separately extruded and machined, further adding to the cost and time of manufacture.

The inventor has also determined that its non-metallic slide bearings are subject to breakdown. For example, during rammer operation, a stacked series of slide bearings is subjected to friction and heat emanating from reciprocating components of the delivery system as well as heat generated by the engine, clutching mechanism and gear box. As heat increases, the slide bearings tend to expand and as heat decreases, the slide bearings tend to contract. Occasionally adjacent slide bearings are forced into each other, overlapping or deforming and seizing up the delivery unit. Also, as the slide bearings expand in response to the system heat, there is an increased likelihood of expansion beyond the limit provided for in the machining of adjacent metal components, thereby seizing up the delivery unit. These breakdowns require the owner to disassemble the machine, replace the disfigured slide bearings, and reassemble the machine, thus costing time and money.

SUMMARY

In the following description, certain terms have been used for brevity, clearness and understanding. No unnecessary limitations are to be implied therefrom beyond the requirement of the prior art because such terms are used for descriptive purposes only and are intended to be broadly construed. The different apparatus, systems and method steps described herein may be used alone or in combination with other apparatus, systems and method steps. It is to be expected that various equivalents, alternatives and modifications are possible within the scope of the appended claims.

In one example, a vibratory percussion rammer includes a motor-driven gear box, and a percussion delivery unit extending downwardly from the gear box, the percussion delivery unit including (1) a ram and shaft assembly extending downwardly from the gear box into a guide cylinder, (2) a spring box extending upwardly into the guide cylinder, and (3) a spring separator coupled to the ram and shaft assembly and disposed in the spring box between upper and lower springs. The ram and shaft assembly is configured to reciprocate up and down and the spring box is configured to reciprocate divergently relative to the reciprocations of the ram and shaft assembly. One or more slide bearings are disposed in the percussion delivery unit between adjacent surfaces of reciprocating metal components. The slide bearings each comprises a sheet of non-metal material that is curved into the shape of a tube having a C-shape in cross section. Preferably, the slide bearings define an open seam extending through the entire length of the slide bearing. Slide bearings can be disposed in the delivery unit to prevent some or all metal-on-metal contact between adjacent reciprocating components, such as for example between the ram and guide cylinder, spring box and the guide cylinder, between the spring separator and the spring box, and/or between a shaft of the ram and shaft assembly and the upper end of the spring box. The non-metal material can for example comprise ultra-high molecular weight polyethylene, polytetrafluoroethylene, or other suitable materials.

In another example, a method of making a vibratory percussion rammer includes the steps of (1) providing a motor-driven gear box and a percussion unit extending downwardly from the gear box, the percussion unit including a ram and shaft assembly extending downwardly from the gear box into a guide cylinder, a spring box extending upwardly into the guide cylinder, and a spring separator coupled to the ram and shaft assembly and disposed in the spring box between upper and lower springs, wherein the ram and shaft assembly are configured to reciprocate up and down and the spring box is configured to reciprocate divergently relative to the reciprocations of the ram and shaft assembly; (2) forming one or more slide bearings out of a sheet of non-metal material by heating the sheet and then forming the sheet into the shape of a tube having a C-shape in cross section; and (3) inserting the tube into the percussion delivery unit between adjacent surfaces of reciprocating metal components. In one example, the sheet is punched from a stock of non-metal material and formed into a tube by wrapping the sheet around a cylindrical mandrel having an outer diameter that is substantially the same as the outer diameter of the spring separator. In further examples, slide bearings are disposed between some or all reciprocating metal components in the percussion delivery unit, such as the between the ram and guide cylinder, guide cylinder and the spring box, between the spring separator and the spring box, and/or between the upper portion of the spring box and a shaft of the ram and shaft assembly.

The amount of thermal expansion of the slide bearing material, such as ultrahigh molecular weight polyethylene (UHMWPE) or polytetrafluoroethylene (PTFE), varies considerably depending on the mass and shape of the bearing material. It is important that the tubular bearings be permitted to expand between limits and in the face of increased normal operating temperatures. Because, in the presently preferred embodiment of the invention, each of the three slide bearings is of a different size and mass, the amount of thermal expansion of each will be different. Furthermore, the largest mass in any one of the three slide bearings is in the width-wise dimension (with respect to the bearing material sheet) or circumferentially (with respect to the sheet after it has been rolled into a tubular shape). Thus, each of the open seams must be selectively chosen to be wider than an anticipated thermal expansion of the bearing in the width-wise direction during normal operation of the rammer. Because expansion of the slide bearings in the width-wise (circumferential) direction causes the width of the seam to be reduced toward complete abutting closure, it is important that the initial width of the seams each be chosen to remain open with thermal expansion during normal operation, i.e. at normal operating temperatures.

Although the present application describes and claims an embodiment of the invention in which the non-metal material of one of a plurality of slide bearings is selected such that a first slide bearing fails prior to a second and/or third slide bearing, there are additional considerations that may be applied to provide a slide bearing failure mechanism that is both highly predictable and results in easier and lower cost repair of a failed slide bearing. Such a failure mechanism may also permit the use of a single preferred slide bearing material, namely, UHMWPE.

Thus, in accordance with another embodiment of the invention, the rammer of the subject invention may be provided with a slide bearing that has an open seam width selected to be wider than an anticipated width-wise thermal expansion of the slide bearing during normal operation, and also selecting the width of the seam to cause the seam to close at a high temperature above a normal operating temperature. In this manner, the failure mechanism can be assigned to the slide bearing that is most easily accessed for repair. In this embodiment, each of the seams of the respective slide bearings has a width selected to be wider than an anticipated width-wise thermal expansion of the respective slide bearing during normal operation, with the easiest of the slide bearings to repair and replace having a seam width selected to cause the seam to close at a selected high temperature above a normal operating temperature and before closure of any other slide bearing seam. Closure of the seam and the consequent imposition of a higher operating temperature (beyond the normal range) will result in seizing and failure of the slide bearing.

BRIEF DESCRIPTION OF THE DRAWINGS

The best mode of carrying out the invention is described with reference to the following drawing figures.

FIG. 6 is a top view of a sheet of non-metal material.
FIG. 7 is a side view of the sheet of non-metal material shown in FIG. 6.
FIG. 8 is a front view of a slide bearing formed from the sheet of material shown in FIG. 6.
FIG. 9 is a side view of the slide bearing shown in FIG. 8.
FIG. 10 is an end view of the slide bearing shown in FIG. 8.

DETAILED DESCRIPTION OF THE DRAWINGS

Figure 1:
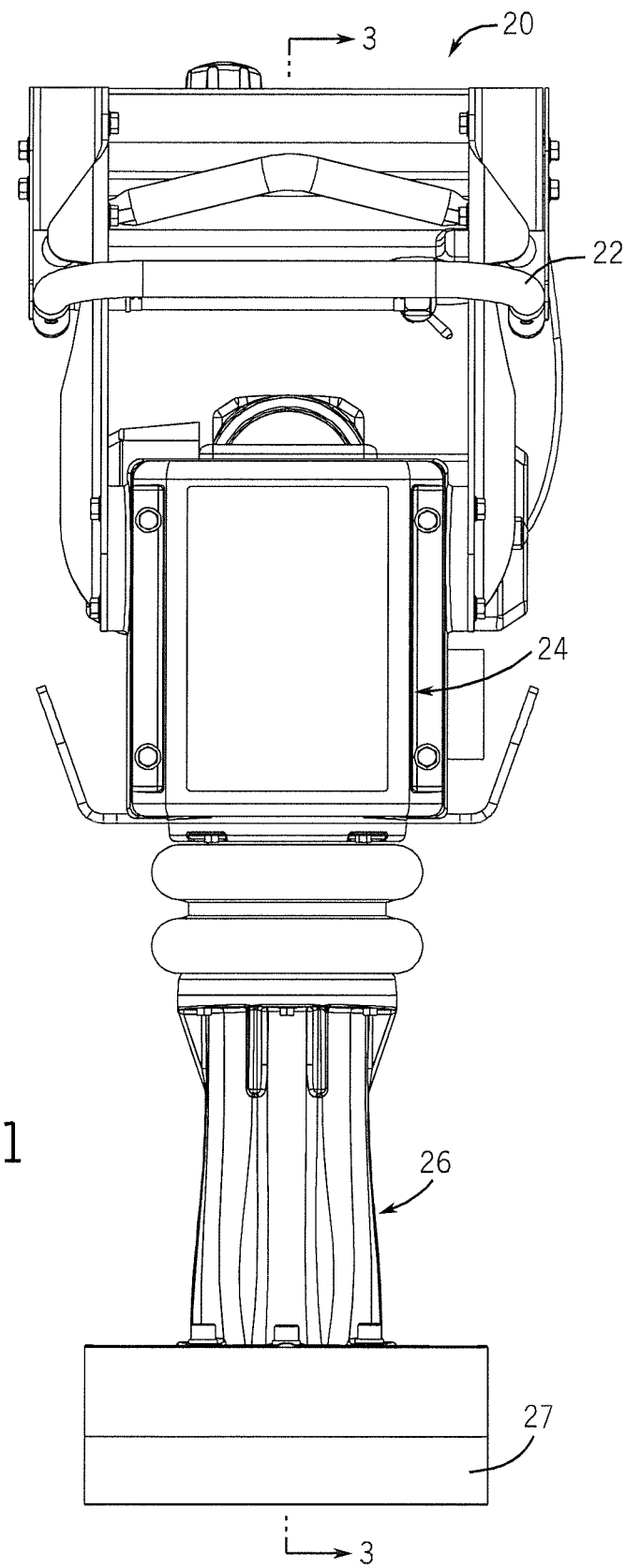
FIG. 1 is a front view of a rammer.
Figure 2:
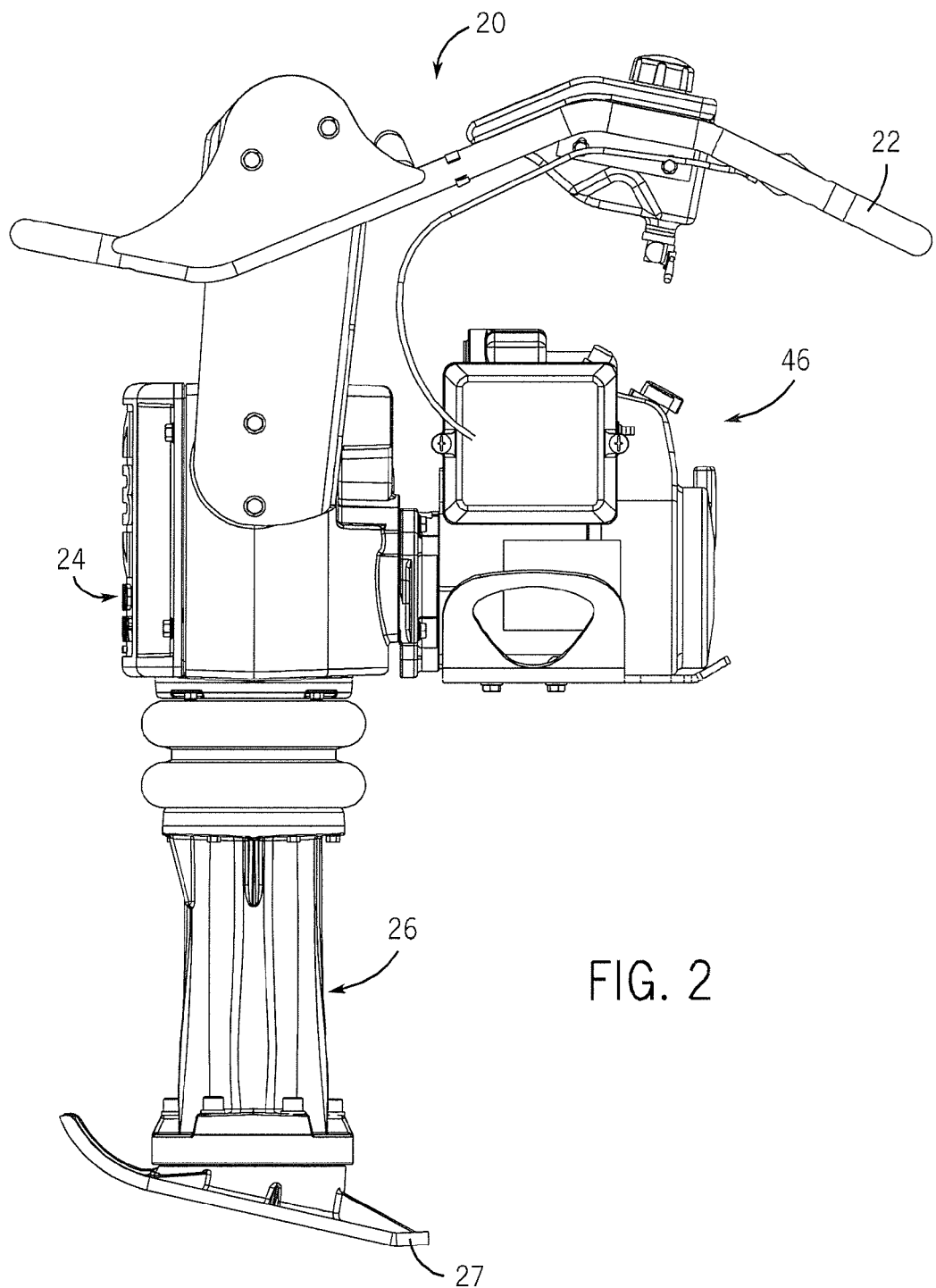
FIG. 2 is a side view of the rammer shown in FIG. 1.

FIGS. 1-4 depict a vibratory percussion rammer 20 for use in the construction industry to compact soil and other loose materials. The rammer 20 includes a handle 22, a gearbox 24, a percussion delivery unit 26 extending downwardly from the gearbox 24, and a ground engaging shoe 27. In the example shown, the percussion delivery unit 26 includes a ram and shaft assembly 28 extending downwardly from the motor-driven gearbox 24 into a guide cylinder 30, a spring box 32 extending upwardly into the guide cylinder 30, and a spring separator 34 coupled to the ram and shaft assembly 28 and disposed in the spring box 32 between upper and lower spring assemblies 36, 38. Spring assemblies 36, 38 are enclosed in the spring box 32 by a cover 44. The spring separator 34 is held in a neutral position by the springs 36, 38 when the percussion delivery unit 26 is not operating.

During operation, a motor 46 that is mounted on the gearbox 24 drives a gear assembly 48, which in turn causes vertical reciprocation of a connecting rod 50. The connecting rod 50 is coupled to the ram and shaft assembly 28 and therefore causes reciprocation of the ram and shaft assembly 28 and spring separator 34, which reciprocation is engaged by the upper and lower springs 36, 38. The springs 36, 38 act on the spring box 32 and cause the spring box 32 to reciprocate divergently relative to the reciprocations of the ram and shaft assembly 28. Shoe 27 attached to the lower end of the spring box 32 thus moves in a generally vertically oriented movement to compact the ground.

Figure 3:
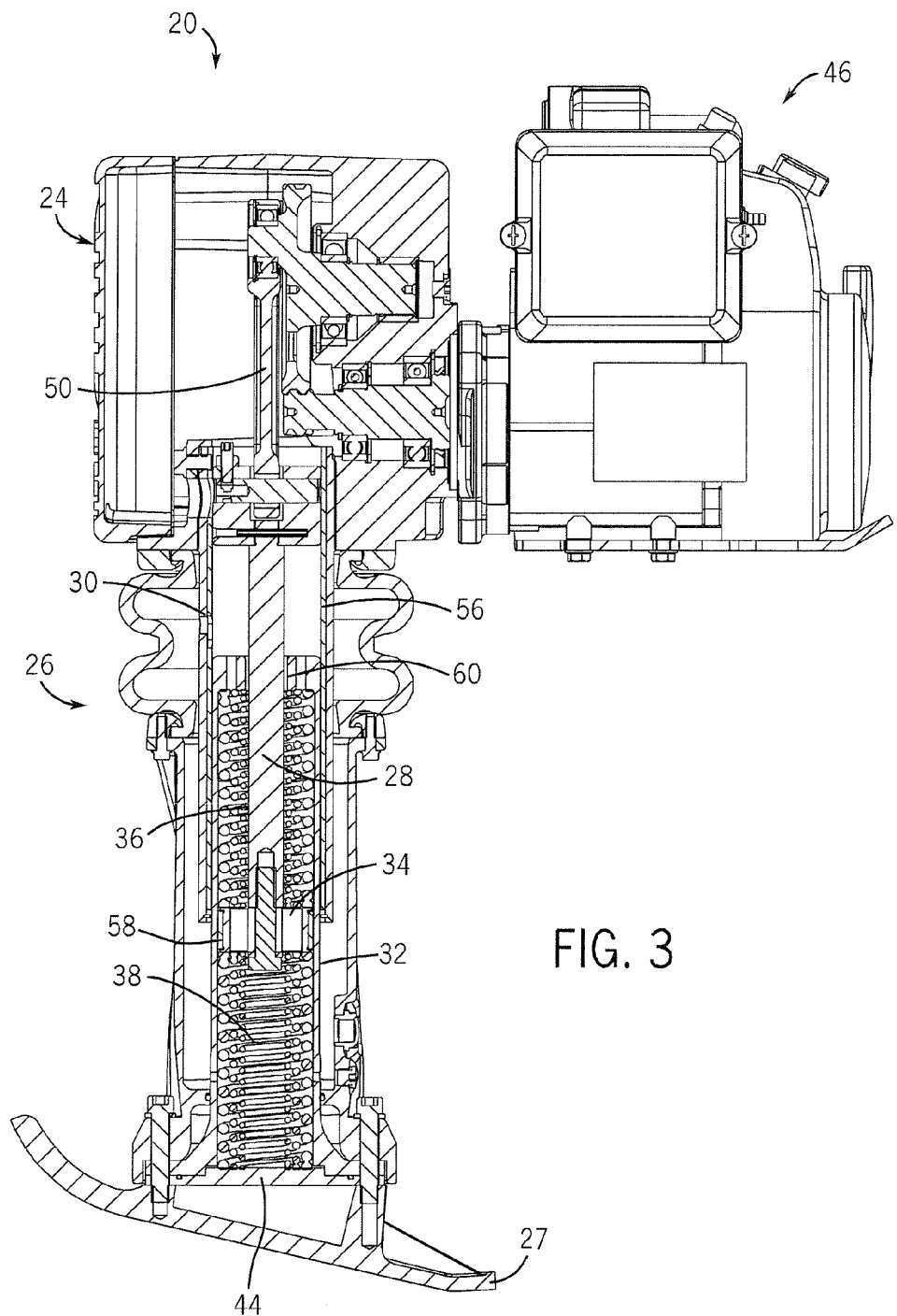
FIG. 3 is a view of Section 3-3 taken in FIG. 1.
Figure 4:
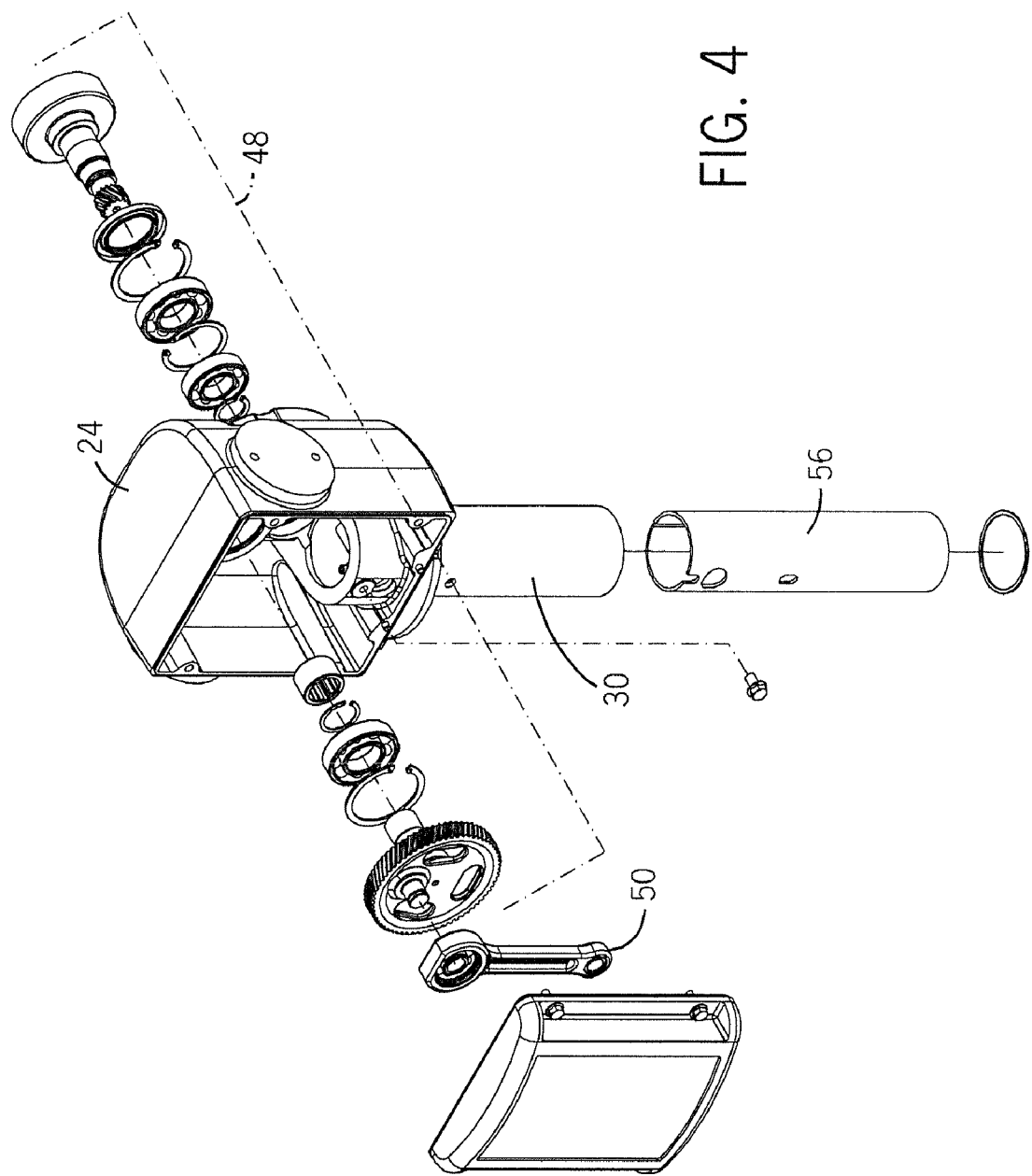
FIG. 4 is an exploded perspective view of parts of the rammer.
Figure 5:
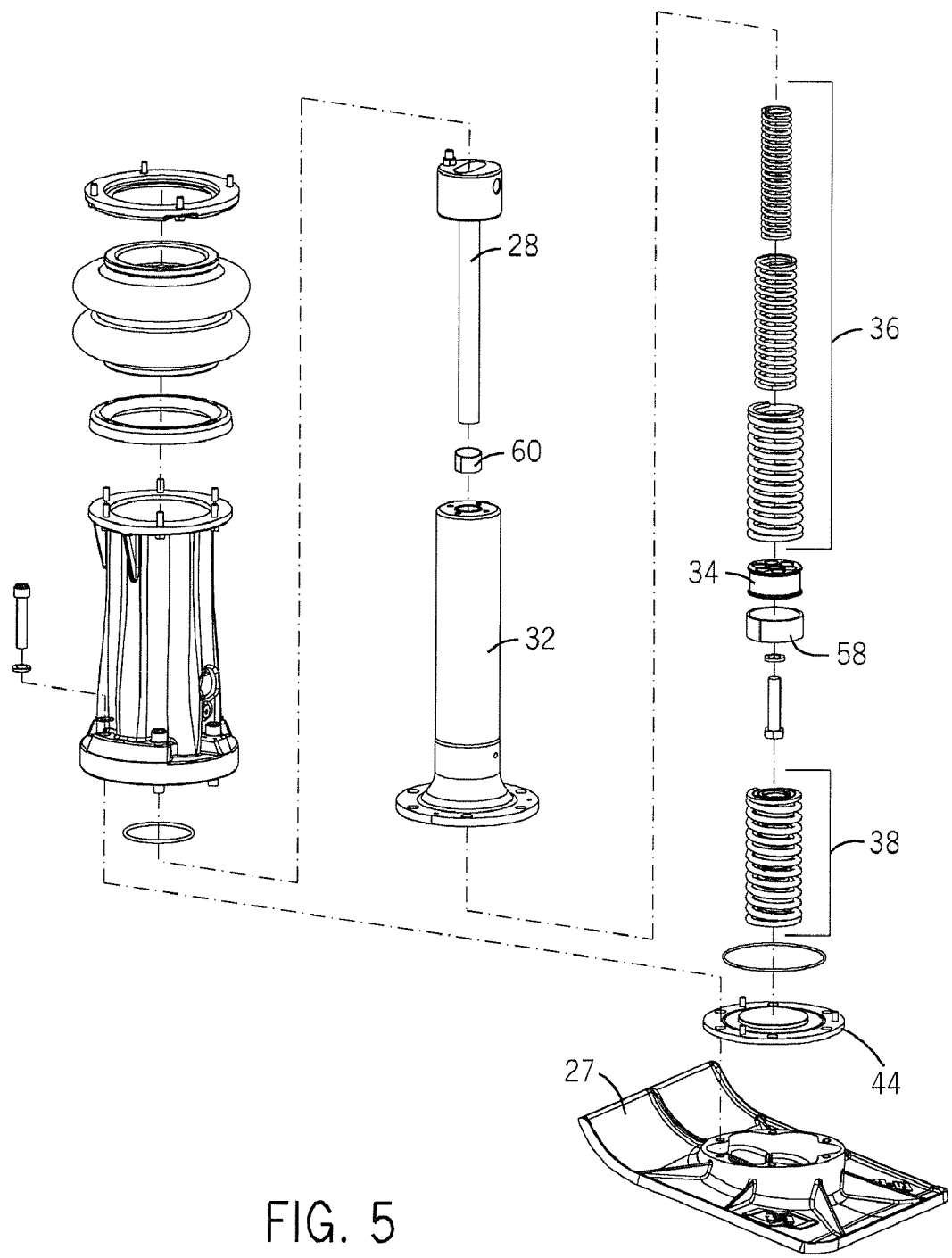
FIG. 5 is an exploded perspective view of parts of the rammer not shown in FIG. 4.

As shown in FIGS. 3-5, a plurality of wear components are disposed in the percussion delivery unit 26 to eliminate metal-on-metal contact between adjacent metal surfaces or components. A slide bearing 56 is disposed between the inner surface of the guide cylinder 30 and the outer surface of the ram and shaft assembly 28 and spring box 32. A slide bearing 58 is disposed between the outer surface of the spring separator 34 and the inner surface of the spring box 32. A slide bearing 60 is disposed between the upper end of the spring box 32 and the outer surface of the shaft on the ram and shaft assembly 28.

FIGS. 6-10 show aspects of the slide bearing 56 in more detail. The slide bearing 56 is formed from a sheet 62 that is punched from a stock of non-metal material. In one example, the non-metal material comprises ultra-high molecular weight polyethylene, however any non-metal material suitable to provide a bearing surface between metal components can be used. In other examples, the sheet of non-metal material can include a composite material formed from ultra-high molecular weight polyethylene that is impregnated with for example bronze, graphite and/or the like. The sheet 62 is heated until malleable by for example a hot water bath or other suitable heating process and then formed into the shape of a tube having a C-shape in cross-section (FIG. 10). In one example, the sheet 62 is formed into the tube by heating the sheet 62 and then wrapping it around a cylindrical mandrel (not shown). In its formed state, the slide bearing 56 thus defines an open seam 64 extending through its entire length. Once formed, the slide bearing 56 is inserted into the percussion delivery unit 26 and is sandwiched between the guide cylinder 30 and the ram and shaft assembly 28 and the spring box 32. The slide bearing 56 thus prevents metal-on-metal contact between the inner surface of the guide cylinder 30 and the outer surface of the ram and shaft assembly 28 and the spring box 32.

Figure 11:
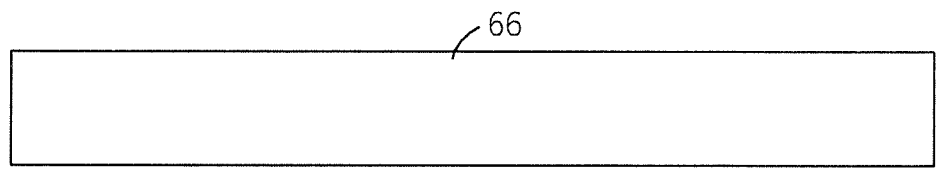
FIG. 11 is a top view of a sheet of non-metal material.
Figure 12:
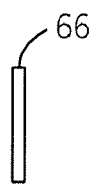
FIG. 12 is a side view of the sheet of material shown in FIG. 11.
Figure 13:
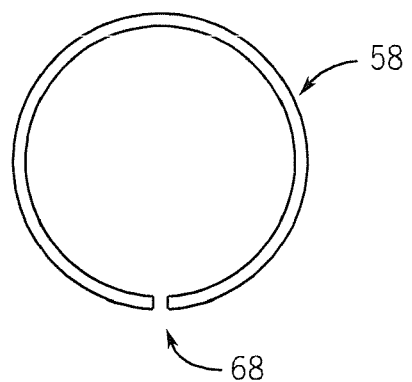
FIG. 13 is an end view of a slide bearing formed from the sheet of material shown in FIG. 11.

FIGS. 11-13 show aspects of the slide bearing 58 in more detail. The slide bearing 58 is formed from a sheet 66 that is punched from a stock of non-metal material. In the preferred arrangement, the non-metal material comprises polytetrafluoroethylene, however any non-metal material suitable to provide a bearing surface between metal components can be used such as ultra-high molecular weight polyethylene. For example, the non-metal material can include a composite material including polytetrafluoroethylene that is impregnated with for example bronze, graphite and/or the like. The sheet 66 is heated until malleable by for example a hot water bath or the like and then formed into the shape of a tube having a C-shape in cross-section (FIG. 13). In one example, the sheet 66 is formed into the tube by heating the sheet 66 and then wrapping it around a cylindrical mandrel (not shown). In its formed state, the slide bearing 58 thus defines an open seam 68 extending through its entire length. Once formed, the slide bearing 58 is inserted into the percussion delivery unit 26 and is sandwiched between the spring separator 34 and the spring box 32. The slide bearing 58 thus prevents metal-on-metal contact between the outer surface of the spring separator 34 and the inner surface of the spring box 32.

Figure 14:
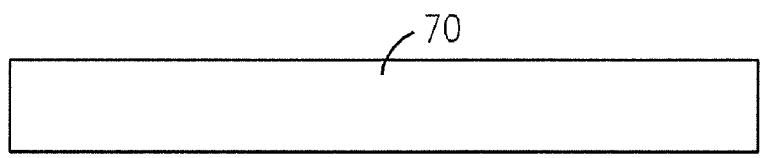
FIG. 14 is a top view of a sheet of non-metal material.
Figure 15:
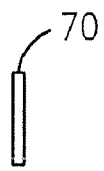
FIG. 15 is a side view of the sheet of material shown in FIG. 14.
Figure 16:
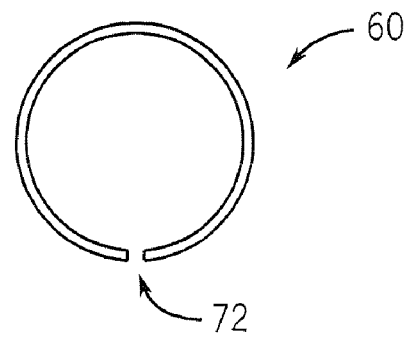
FIG. 16 is an end view of a slide bearing formed from the sheet of material shown in FIG. 14.

FIGS. 14-16 show aspects of the slide bearing 60 in more detail. The slide bearing 60 is formed from a sheet 70 that is punched from a stock of non-metal material. In the preferred arrangement, the non-metal material comprises polytetrafluoroethylene, however any non-metal material suitable to provide a bearing surface between metal components can be used, such as ultra-high molecular weight polyethylene. For example, the non-metal material can include a composite material including polytetrafluoroethylene that is impregnated with for example bronze, graphite and/or the like. The sheet 70 is heated until malleable by for example a hot water bath or other suitable heating process and then formed into the shape of a tube having a C-shape in cross-section (FIG. 16). In one example, the sheet 70 is formed into the tube by heating the sheet 70 and then wrapping it around a cylindrical mandrel (not shown). In its formed state, the slide bearing 60 thus defines an open seam 72 extending through its entire length. Once formed, the slide bearing 60 is inserted into the percussion delivery unit 26 at the top of the spring box 32 and between the spring box 32 and the shaft of the ram and shaft assembly 28. The slide bearing 60 thus prevents metal-on-metal contact between the outer surface of the shaft of the ram and shaft assembly 28 and the top of the spring box 32.

It has been found in more recent testing that UHMWPE provides adequate lubricity and bearing qualities, but is not subject to wrinkling and failure at high temperatures as is the case with PTFE. Thus, each of the three slide bearings 56, 58, 60 is preferably formed from a sheet of UHMWPE. In addition, this material is more easily formed in an alternate step to heating and forming around a mandrel. In particular, the C-shaped slide bearings can be formed by running the UHMWPE sheet through a set of rollers in a manner similar to the way sheet metal pieces are rolled into a tubular shape. Heating the sheet material is not necessary and this alternate and currently preferred method step is much simpler.

In addition, roll forming of the plastic sheet material does not require that it be formed into a substantially fully cylindrical tube. Rather, the sheet may be shaped by roll forming to a shape that can easily be grasped and curled manually by the assembler, whereupon it is easily slid vertically into position.

Forming the slide bearings 56, 58, 60 out of sheet material eliminates the expensive extrusion process required in the prior art. The sheet material is relatively inexpensive and easy to obtain in consistent sizes and relatively easy to fabricate into the shape of a tube having a C-shape in cross section. The sheets 62, 66, 70 can have various sizes and characteristics depending upon the particular application. Sheets of ultra-high molecular weight polyethylene and polytetrafluoroethylene are commonly available at any fractional thickness dimension starting at 0.03125 inches up to several inches thick. Both materials are also available as a thin film, as thin as 0.002 inches thick.

Advantageously, the methods described herein are much simpler than the prior art methods and result in a percussion rammer having slide bearings that are more functional and adaptable for use and less expensive to manufacture. According to the preferred methods described herein, a single elongated slide bearing can be easily and efficiently manufactured to provide a bearing surface along the entire elongated wear surface in the percussion delivery unit and smaller slide bearings manufactured to provide replaceable, low cost bearing surfaces on the outer diameter of the spring separator and the inner diameter of the spring box. The preferred methods described herein eliminate extrusion and machining processes that were previously necessary and that were found to be highly expensive and time consuming. Further, the total elimination of metal-on-metal reciprocating components in the delivery system significantly reduces the cost of rammer maintenance while extending rammer life relative to rammers lacking low cost, easily replaced wear surfaces with a lowered probability of incurring system jamming by virtue of material instability.

The open seams 64, 68, 72 provide the slide bearing with flexibility to change shape and size during installation and during rammer operation. The flexibility of the C-shaped slide bearings made from sheets of bearing materials facilitates easy installation or replacement wherever used in the rammer's percussion system. This also allows cost effective formation of a single elongated slide bearing 56 that serves to reduce friction along the entire length of the delivery unit 24. Advantageously, the C-shape of the slide bearings provides more flexibility for the bearings to expand and contract in the width-wise direction of the sheet, or in the cross-sectional direction (circumferentially after forming) in response to extreme rammer operating conditions such as temperature and friction and has thus been found to decrease the likelihood of jamming inside the delivery unit 24.

The open seams 64, 68, 72 are preferably selected to have a width that is greater than the anticipated expansion of the wear component, yet small enough to prevent metal-to-metal contact between adjacent rammer components. The C-shape of the bearings 56, 58, 60 allows the bearings to expand in the width-wise direction as compared to the prior M-B-W, Inc. wear components.

In one example, the slide bearings 58 and 60 are made of polytetrafluoroethylene and the slide bearing 56 is made of ultra-high molecular weight polyethylene. It is not necessary to form the slide bearing 56 from the more expensive polytetrafluoroethylene because the operating conditions at the location of the slide bearing are not as extreme as at the locations of the slide bearings 58 and 60. In addition, the ultra-high molecular weight polyethylene is more unstable than the polytetrafluoroethylene under extreme operating conditions. Advantageously, the slide bearing 56 can therefore comprise the "weakest link" in the system in terms of failure under extreme operating conditions. In this example, the material of the slide bearing 56 can be selected such that the slide bearing 56 will fail prior to failure of any other expensive components in the rammer. If the machine enters into a failure mode, the weakest link, namely the slide bearing 56 will fail instead of any other expensive components. The slide bearing 56 is relatively low cost and easy to replace according to the methods described above. This facilitates a safety mechanism which saves significant cost that can be incurred to repair more expensive rammer components. A similar approach could potentially be taken with other slide bearings 58, 60.

The unique replaceable wear components described herein last longer than the wear surfaces of expensive metal components, create less friction and heat, preserve lubricant integrity, and produce less internal load for the engine of the rammer to overcome. Less friction, heat and wear in the delivery unit translates into lower horsepower demands to run the rammer, which means fewer engine and delivery system problems and longer overall product life.

In a preferred embodiment of the rammer of the present invention and the method by which it is made, the open seam in a specific one of the slide bearings, namely, first slide bearing 56, is provided with an open seam that will close and fail first and is also the easiest slide bearing to replace upon failure. Because slide bearing 56 has a thickness comparable to the other two slide bearings, but has a much larger diameter, it will expand in the width-wise direction (circumferential when formed) to a much greater degree than the other two slide bearings 58 and 60. Thus, although the initial open seam of the first slide bearing 56 is larger in width than the seams of the other two slide bearings 58 and 60, the width-wise expansion in the large diameter bearing 56 is much greater than in the other two. In addition, the width of large slide bearing 56 is sized to close, leading quickly to bearing seize up and failure at temperatures above a normal operating range before failure of the other two slide bearings.

In addition, and in accordance with a preferred embodiment, the construction of the percussion rammer results in the first bearing sleeve 56 being the easiest to remove and replace. For a replacement, the front cover for the gear box 24 is first removed and then a connecting pin between the ram shaft 28 and the connecting rod 50 is removed, followed by unbolting the upper gear box 24 from the lower percussion delivery unit 26. Thereafter, a first slide bearing 56 is removed axially and replaced. The other slide bearings are unaffected, still perform properly, and do not have to be removed in a much more complicated and time consuming disassembly of the percussion delivery unit 26.

What is claimed is:

1. A method of making a vibratory percussion rammer, the method comprising:
   providing a motor-driven gearbox and a percussion unit extending downwardly from the gearbox, the percussion unit comprising
   a ram and shaft assembly extending downwardly from the gearbox into a guide cylinder,
   a spring box extending upwardly into the guide cylinder, and
   a spring separator coupled to the ram and shaft assembly and disposed in the spring box between upper and lower springs,
   the ram and shaft assembly configured to reciprocate up and down and the spring box configured to reciprocate divergently relative to the reciprocations of the ram and shaft assembly;
   forming a slide bearing out of a sheet of non-metal material having a length and a width by shaping the sheet into a tube having a C-shape in cross-section that defines an open seam having a width between opposed seam edges and extending along the entire length of the slide bearing;
   sizing the sheet so that the open seam is wider than an anticipated width-wise thermal expansion of the slide bearing during normal operation of the vibratory percussion rammer;
   selecting the width of the seam such that, in the event the operating temperature of the rammer exceeds a selected high temperature above a normal operating temperature, the seam will close reducing the seam to abutting closure of the seam edges; and
   inserting the slide bearing between adjacent surfaces of reciprocating metal components.

2. A method according to claim 1, wherein the sheet is formed by roll-forming the sheet in a series of offset rollers.

3. A method according to claim 2, wherein the roll-forming step results in a partial C-shape cross-section.

4. The method according to claim 3, wherein the non-metal material comprises ultra-high molecular weight polyethylene.

5. The method according to claim 1, wherein the inserting step utilizes a first slide bearing and the reciprocating metal components comprise the guide cylinder and the ram and shaft assembly and spring box.

6. A method according to claim 5, wherein the inserting step utilizes a second slide bearing and the reciprocating metal components comprise the spring separator and spring box, and
   wherein the second slide bearing seam remains open when the first slide bearing seam closes.

7. The method according to claim 6, wherein the inserting step utilizes a third slide bearing and the reciprocating metal components comprise an upper portion of the spring box and a shaft of the ram and shaft assembly, and wherein the third slide bearing seam remains open when the first slide bearing seam closes.

8. A vibratory percussion rammer comprising:
a motor-driven gearbox;
a percussion delivery unit extending downwardly from the gearbox, the percussion delivery unit comprising
a ram and shaft assembly extending downwardly from the gearbox into a guide cylinder,
a spring box extending upwardly into the guide cylinder, and
a spring separator coupled to the ram and shaft assembly and disposed in the spring box between upper and lower springs,
the ram and shaft assembly configured to reciprocate up and down and the spring box configured to reciprocate divergently relative to the reciprocations of the ram and shaft assembly; and
a slide bearing disposed in the percussion delivery unit between adjacent surfaces of reciprocating metal components;
the improvement wherein the slide bearing comprises a sheet of non-metal material that is curved into the shape of a tube having a C-shape in cross section and an open seam extending between exposed seam edges along the entire length of the slide bearing;
wherein the slide bearing has an open seam width selected to be wider than an anticipated width-wise thermal expansion of the slide bearing during normal operation; and
the width of the seam is selected to cause the seam to close resulting in abutting closure of the seam edges at a high temperature above a normal operating temperature.

9. The rammer of claim 8, wherein the slide bearing is disposed between the spring box and both the ram and shaft assembly and guide cylinder.

10. The rammer of claim 9, wherein the non-metal material comprises ultra-high molecular weight polyethylene.

11. A vibratory percussion rammer comprising:
a reciprocating drive;
a percussion delivery unit extending downwardly from the drive, the percussion delivery unit comprising
a ram and shaft assembly extending downwardly from the drive into a guide cylinder,
a spring box extending upwardly into the guide cylinder, and
a spring separator coupled to the ram and shaft assembly and disposed in the spring box between upper and lower springs,
the ram and shaft assembly configured to reciprocate up and down and the spring box configured to reciprocate divergently relative to the reciprocations of the ram and shaft assembly; and
a plurality of slide bearings disposed in the percussion delivery unit, each of the slide bearings comprising a sheet of non-metal material that is formed into the shape of a tube having a C-shape in cross section and an open seam extending through the entire length of the slide bearing;
the plurality of slide bearings comprising a slide bearing disposed between the guide cylinder and both the ram and shaft assembly and the spring box, a slide bearings disposed between the spring separator and the spring box, and a slide bearing disposed between a shaft of the ram and shaft assembly and an upper end of the spring box;
each of said seams having a width between opposed seam edges selected to be wider than an anticipated widthwise thermal expansion of the respective slide bearing during normal operation; and
one of said slide bearings having a seam width selected to cause the seam to close at a selected high temperature above normal operating temperature and reducing the seam to abutting closure of the seam edges.

12. The rammer of claim 11, wherein said one slide bearing comprises the slide bearing disposed between the guide cylinder and both the ram and shaft assembly and the spring box.

13. The rammer of claim 12, wherein the seams of other of said slide bearings have a seam width selected to remain open at the selected high temperature above the normal operating temperature of said one slide bearing.

14. The rammer of claim 11, wherein the plurality of slide bearings prevents all metal-on-metal contact between adjacent reciprocating metal components in the percussion delivery unit.

15. A method of making a vibratory percussion rammer, the method comprising:
providing a motor-driven gearbox and a percussion unit extending downwardly from the gearbox, the percussion unit comprising
a ram and shaft assembly extending downwardly from the gearbox into a guide cylinder,
a spring box extending upwardly into the guide cylinder, and
a spring separator coupled to the ram and shaft assembly and disposed in the spring box between upper and lower springs,
the ram and shaft assembly configured to reciprocate up and down and the spring box configured to reciprocate divergently relative to the reciprocations of the ram and shaft assembly;
forming a plurality of slide bearings out of a plurality of sheets of non-metal material having a length and a width by shaping each sheet in the plurality of sheets into a tube having a C-shape in cross-section that defines an open seam having a width between opposed seam edges and extending along the entire length of the slide bearing;
inserting a first slide bearing from the plurality of slide bearings between the guide cylinder and the ram and shaft assembly and spring box, wherein the first slide bearing has an open seam that is wider than an anticipated width-wise thermal expansion of the first slide bearing during normal operation of the vibratory percussion rammer so as to prevent contact between the guide cylinder and the ram and shaft assembly and spring box;
inserting a second slide bearing from the plurality of slide bearings between the spring separator and spring box, wherein the second slide bearing has an open seam that is wider than an anticipated width-wise thermal expansion of the second slide bearing during normal operation of the vibratory percussion rammer so as to prevent contact between the spring separator and spring box; and
inserting a third slide bearing from the plurality of slide bearings between an upper portion of the spring box and a shaft of the ram and shaft assembly, wherein the third slide bearing has an open seam that is wider than an anticipated width-wise thermal expansion of the third slide bearing during normal operation of the vibratory percussion rammer so as to prevent contact between the upper portion of the spring box and the shaft of the ram and shaft assembly; and selecting the width of the seam in the first slide bearing such that, in the event of operation of the rammer at a selected high temperature above a normal operating temperature, the first slide bearing seam will close reducing said seam to complete abutting closure of the seam edges before the respective seam edges of the seams in the second and third slide bearings close and the seam edges abut.

16. The method of claim 15 wherein the non-metal slide bearing material comprises ultra-high molecular weight polyethylene.

* * * * *